United States Patent [19]

Humburg

[11] Patent Number: 5,702,055
[45] Date of Patent: Dec. 30, 1997

[54] VEHICLE HEATER WITH FUEL PUMP COOLING

[75] Inventor: Michael Humburg, Göppingen, Germany

[73] Assignee: J. Eberspächer GmbH & Co., Esslingen, Germany

[21] Appl. No.: 656,272

[22] PCT Filed: Dec. 27, 1994

[86] PCT No.: PCT/EP94/04308

§ 371 Date: May 29, 1996

§ 102(e) Date: May 29, 1996

[87] PCT Pub. No.: WO95/18341

PCT Pub. Date: Jul. 6, 1995

[30] Foreign Application Priority Data

Dec. 31, 1993 [DE] Germany ............... 43 45 057.1

[51] Int. Cl.$^6$ ................................. G05D 23/00
[52] U.S. Cl. ............... 237/214; 237/12.3 C; 431/2; 431/265
[58] Field of Search ............ 237/12.3 C; 4341/2, 4341/265; 126/110 B, 110 C, 110 D

[56] References Cited

U.S. PATENT DOCUMENTS 4,307,701  12/1981  Balon et al. ............... 126/110 B

FOREIGN PATENT DOCUMENTS

| 65776 | 3/1956 | France . |
|---|---|---|
| 1401939 | 11/1968 | Germany . |
| 24 53 202 C3 | 1/1982 | Germany . |
| 24 32 850 C2 | 3/1983 | Germany . |
| 35 01 719 | 1/1986 | Germany . |
| 33 10 501 C2 | 2/1988 | Germany . |
| 36 39 222 C1 | 7/1988 | Germany . |
| 35 01 719 C2 | 4/1993 | Germany . |

*Primary Examiner*—Henry A. Bennet
*Assistant Examiner*—Derek S. Boles
*Attorney, Agent, or Firm*—McGlew and Tuttle

[57] ABSTRACT

In a vehicle heating appliance, a burner is supplied with combustion air by a combustion air fan and with fuel by a fuel dosing pump. The heat generated by the burner in a combustion chamber is absorbed by a liquid or gaseous heat transfer medium through a heat exchanger that surrounds the combustion chamber and is transferred to the areas to be heated. In order to avoid malfunctions of the fuel dosing pump caused by steam bubbles produced by overheating, the fuel dosing pump must be kept cool. To ensure an efficient cooling of the fuel dosing pump, the fuel dosing pump is mounted in a compact manner in a suction channel (8) of the combustion air fan (1). When the vehicle heating appliance is in operation, combustion air flows past the outer surface of the fuel dosing pump (14) and cools the pump before being led to the inlet side of the combustion air fan (1, 4).

19 Claims, 1 Drawing Sheet

VEHICLE HEATER WITH FUEL PUMP COOLING

FIELD OF THE INVENTION

The present invention pertains to a vehicle heater with a burner, to which combustion air is fed by a combustion air blower and to which fuel is fed by means of a fuel feed pump.

BACKGROUND OF THE INVENTION

Such vehicle heaters, which are also frequently called auxiliary heaters or the like, are used in passenger cars, trucks, buses, but also in recreational vehicles, airplanes, construction equipment, and motor yachts. With the combustion air blower switched on, fuel is fed to the burner via the fuel feed pump. The fuel, atomized with an evaporator, atomizer or the like, to which combustion air is added, burns within a combustion chamber, which is surrounded by a heat exchanger. The heat exchanger releases the thermal energy to a heat carrier, e.g., water or water with antifreeze or air.

Numerous embodiments of vehicle heaters of this type have been known. The fuel feed pump is usually located at a certain distance from the combustion chamber, because the temperature of the fuel feed pump shall possibly be maintained below 35° C. for the correct function of the fuel feed pump, and because malfunctions develop above these temperatures due to the formation of vapor bubbles in the fuel (especially gasoline).

If such a vehicle heater is to be built as a compact heater, i.e., if all essential components (combustion chamber, heat exchanger, combustion air blower, fuel feed pump and control unit) are to be arranged in the smallest possible space, which is desirable for many applications, if not necessary for the use of such a vehicle heater, the risk arises that the fuel feed pump will be excessively heated because of the release of heat by the electric motor driving the pump and/or due to external thermal effects, e.g., from the combustion chamber.

SUMMARY AND OBJECTS OF THE INVENTION

The object of the present invention is to provide a vehicle heater of the above-described class, in which correct function of the fuel feed pump is always guaranteed by sufficient cooling even in the case of compact design of the heater.

This object is accomplished in a vehicle heater of the above-described type by the fuel feed pump being arranged in the combustion air flow.

During operation, air is drawn in from the environment by the combustion air blower and is fed to the burner. An intake channel housing is preferably provided for this purpose in front of the combustion air blower, and the fuel feed pump—or at least a large part of it—is located according to the present invention around the intake housing. When the burner is in operation—cooling of the fuel feed pump is necessary during operation of the burner only—the air flow generated by the combustion air blower flows through the intake channel housing, thus cooling the fuel feed pump located in the intake channel sufficiently.

The fuel feed pump is advantageously mounted within the intake channel by means of holding webs such that combustion air flows practically all around the fuel feed pump.

Even though the fuel feed pump may also be arranged, in principle, on the downstream side of the combustion air blower according to the present invention, there is not enough space at that point in practice, especially in the case of a vehicle heater of compact design, so that arrangement upstream of the combustion air blower is recommended.

To achieve the most uniform cooling possible, the present invention provides for the intake channel having an approximately round cross section and for the fuel feed pump likewise having an approximately round cross section in its broadest area, wherein the latter cross section is somewhat smaller than that of the intake channel, and for the fuel feed pump being mounted in the intake channel such that the longitudinal axis of the intake channel essentially coincides with the longitudinal axis of the fuel feed pump. An electromagnetic reciprocating pump is preferably used as the fuel feed pump, and the direction of movement of the piston coincides with the longitudinal axis of the pump.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

The essential components of a vehicle heater being discussed here are known to the person skilled in the art and therefore they do not need to be specifically explained. The essential components are the combustion chamber, a heat exchanger surrounding the combustion chamber, through which a liquid or gaseous heat carrier is pumped, a combustion air blower, a fuel feed pump, and a control unit.

Figure 1:
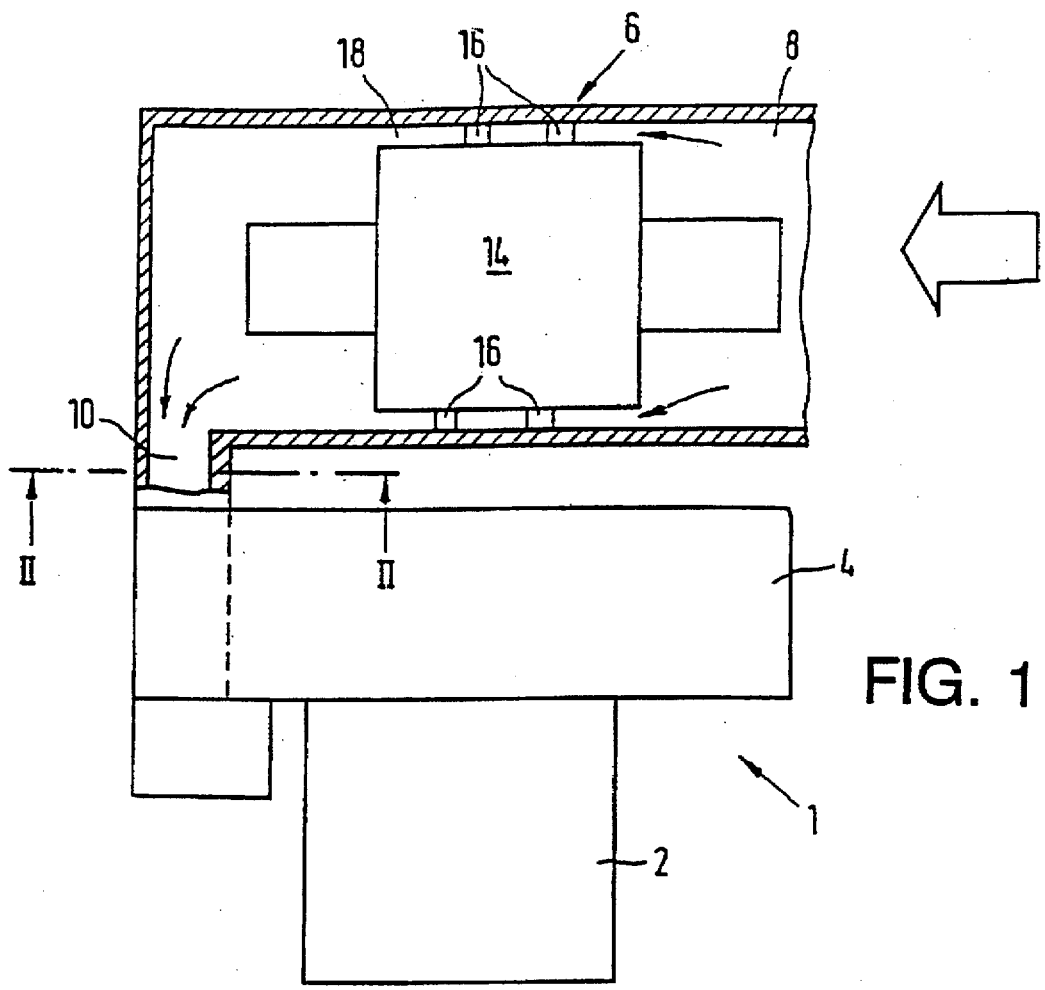
FIG. 1 shows a partially cutaway schematic view of a combination of a combustion air blower with intake channel housing and the fuel feed pump arranged therein.

Of these essential components of the vehicle heater, FIG. 1 shows only the parts that are of interest here, namely, a combustion air blower 1 and a fuel feed pump 14.

The combustion air blower 1 has an electric drive motor 2 and a side channel blower 4 coupled with it. The side channel blower is located in a housing of an approximately round cross section at right angles to the longitudinal axis of the combustion air blower (corresponding to the drive shaft of the blower motor 2).

Figure 2:
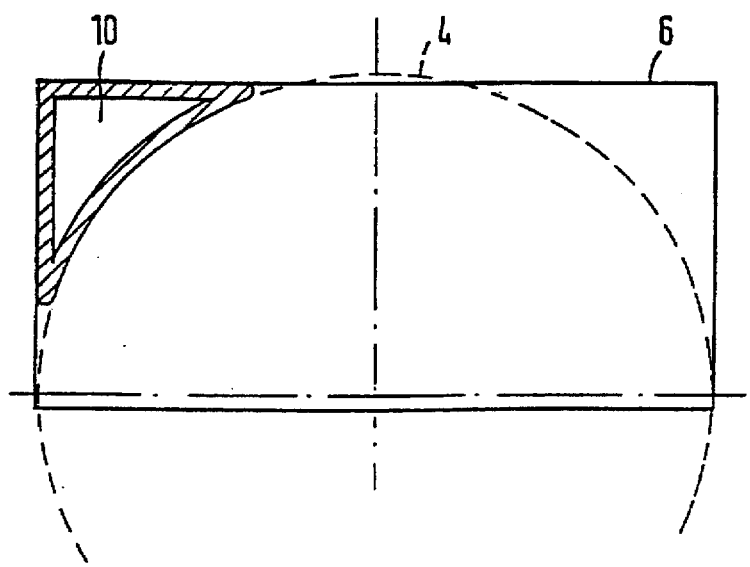
FIG. 2 shows a view according to line II—II in FIG. 1.

The combustion air blower 1 is preceded by an intake channel housing 6 with an intake channel 8 of an approximately round cross section and with a feed channel 10, which joins it in the left-hand part of FIG. 1, has an approximately triangular cross section at an interface according to FIG. 2 and is thus adapted to the outer circumference of the side channel blower 4.

The fuel feed pump 14 is arranged inside the intake channel 8 by means of holding webs 16, and the electric leads as well as the fuel lines are omitted in FIG. 1 for simplicity's sake. In the broadest area, the fuel feed pump 14 also has an approximately round cross section, which is somewhat smaller than the cross section of the intake channel 8, so that an annular flow space 18 is formed between the inner wall of the intake channel housing 6 and the outer wall of the fuel feed pump. Combustion air drawn in from the outside flows through this flow space in the direction indicated by the arrow during the operation of the combustion air blower 1, thus cooling the entire fuel feed pump. After the combustion air has passed through the flow space between the fuel feed pump and the inner wall of the intake channel housing 6, it reaches the inlet (not specifically shown in FIG. 1) of the side channel blower 4 of the combustion air blower 1 through the feed channel 10. A certain heating of the combustion air during its flow past the fuel feed pump 14 is readily accepted now, because the slightly heated combustion air facilitates the combustion process.

FIG. 2 schematically shows the intake channel housing 6 with the feed channel 10, wherein the housing of the side channel blower 4 is also indicated for clarity's sake.

The fuel line to the pump 14 and the fuel feed line from the pump 14 to the burner (neither of which is shown) extend over part of their length through the intake channel housing (6), so that cooling of the fuel takes place there as well.

While specific embodiments of the invention have been shown and described in detail to illustrate the application of the principles of the invention, it will be understood that the invention may be embodied otherwise without departing from such principles.

I claim:

1. A vehicle heater comprising:
    a burner;
    a combustion air blower for feeding combustion air to said burner;
    an intake channel housing, provided separate from said burner on an upstream side of said combustion air blower, said intake channel housing for guiding the combustion air into a flow leading to said combustion air blower;
    a fuel feed pump for feeding fuel to said burner, said fuel feed pump being mounted in said intake channel housing and in said flow of the combustion air for heat transfer between said fuel pump and said flow of combustion air.

2. A vehicle heater in accordance with claim 1, further comprising:
    web means for mounting said fuel feed pump substantially centrally in said intake channel to cause said flow to substantially surround all sides of said fuel feed pump.

3. A vehicle heater in accordance with claim 1, wherein:
    said intake channel has a substantially round cross section with a longitudinal axis; and
    said fuel feed pump has a substantially round cross section with a diameter less than a diameter of said cross section of said intake channel, said fuel feed pump having a longitudinal axis substantially aligned with said longitudinal axis of said intake channel.

4. A vehicle heater in accordance with claim 2, wherein:
    said intake channel has a substantially round cross section with longitudinal axis; and
    said fuel feed pump has a substantially round cross section with a diameter less than a diameter of said cross section of said intake channel, said fuel feed pump having a longitudinal axis substantially aligned with said longitudinal axis of said intake channel.

5. A vehicle heater in accordance with claim 2, wherein:
    said web means extends from an inside of said intake channel to an outside of said fuel feed pump.

6. A vehicle heater in accordance with claim 1, wherein:
    said fuel feed means has a longitudinal axis substantially aligned with a direction of said flow in said intake channel.

7. A vehicle heater in accordance with claim 4, wherein:
    said web means extends from an inside of said intake channel to an outside of said fuel feed pump; and
    said fuel feed means has a longitudinal axis substantially aligned with a direction of said flow in said intake channel.

8. A vehicle heater comprising:
    a burner;
    a combustion air blower for feeding combustion air to said burner;
    an intake channel housing, said intake channel housing for guiding the combustion air into a flow leading to said combustion air blower;
    a fuel feed pump for feeding fuel to said burner, said fuel feed pump being mounted in said intake channel housing and in said flow of the combustion air; and
    web means for mounting said fuel feed pump substantially centrally in said intake channel to cause said flow to substantially surround all sides of said fuel feed pump.

9. A vehicle heater in accordance with claim 8, wherein:
    said intake channel has a substantially round cross section with a longitudinal axis; and
    said fuel feed pump has a substantially round cross section with a diameter less than a diameter of said cross section of said intake channel, said fuel feed pump having a longitudinal axis substantially aligned with said longitudinal axis of said intake channel.

10. A vehicle heater in accordance with claim 8, wherein:
    said web means extends from an inside of said intake channel to an outside of said fuel feed pump.

11. A vehicle heater in accordance with claim 8, wherein:
    said fuel feed means has a longitudinal axis substantially aligned with a direction of said flow in said intake channel.

12. A vehicle heater in accordance with claim 10, wherein:
    said web means extends from an inside of said intake channel to an outside of said fuel feed pump; and
    said fuel feed means has a longitudinal axis substantially aligned with a direction of said flow in said intake channel.

13. A vehicle heater comprising:
    a burner;
    a combustion air blower for feeding combustion air to said burner;
    an intake channel housing, provided separate from said burner, said intake housing being on an upstream side of said combustion air blower and said burner being on a downstream side of said combustion with respect to said burner, said intake channel housing for guiding the combustion air into a flow leading to said combustion air blower;
    a fuel feed pump for feeding fuel to said burner; and
    means for mounting said fuel feed pump in said intake channel housing and in said flow of the combustion air for heat transfer between said fuel pump and said flow of combustion air.

14. A vehicle heater in accordance with claim 13, wherein:
    said mounting means includes webs mounting said fuel feed pump substantially centrally in said intake channel to define a substantially annular flow passage to substantially surround all sides of said fuel feed pump with said flow.

15. A vehicle heater in accordance with claim 13, wherein:

said intake channel has a substantially round cross section with a longitudinal axis; and said fuel feed pump has a substantially round cross section with a diameter less than a diameter of said cross section of said intake channel, said fuel feed pump having a longitudinal axis substantially aligned with said longitudinal axis of said intake channel.

16. A vehicle heater in accordance with claim 14, wherein:

said intake channel has a substantially round cross section with longitudinal axis; and said fuel feed pump has a substantially round cross section with a diameter less than a diameter of said cross section of said intake channel, said fuel feed pump having a longitudinal axis substantially aligned with said longitudinal axis of said intake channel.

17. A vehicle heater in accordance with claim 13, wherein:

said web means extends from an inside of said intake channel to an outside of said fuel feed pump.

18. A vehicle heater in accordance with claim 13, wherein:

said fuel feed means has a longitudinal axis substantially aligned with a direction of said flow in said intake channel.

19. A vehicle heater in accordance with claim 16, wherein:

said web means extends from an inside of said intake channel to an outside of said fuel feed pump; and said fuel feed means has a longitudinal axis substantially aligned with a direction of said flow in said intake channel.

* * * * *